US008806180B2

(12) United States Patent
Ringseth et al.

(10) Patent No.: US 8,806,180 B2
(45) Date of Patent: Aug. 12, 2014

(54) TASK EXECUTION AND CONTEXT SWITCHING IN A SCHEDULER

(75) Inventors: Paul F. Ringseth, Bellevue, WA (US); Genevieve Fernandes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1582 days.

(21) Appl. No.: 12/113,209

(22) Filed: May 1, 2008

(65) Prior Publication Data

US 2009/0276778 A1   Nov. 5, 2009

(51) Int. Cl.
G06F 15/00 (2006.01)
G06F 15/76 (2006.01)

(52) U.S. Cl.
USPC .......................................... 712/228; 712/214

(58) Field of Classification Search
USPC ................... 712/228, 229; 718/108
See application file for complete search history.

(56) References Cited

U.S. PATENT DOCUMENTS

| 5,613,114 | A  | * | 3/1997 | Anderson et al. | 718/108 |
|---|---|---|---|---|---|
| 5,666,523 | A  |   | 9/1997 | D'Souza | |
| 6,085,215 | A  | * | 7/2000 | Ramakrishnan et al. | 718/102 |
| 6,341,303 | B1 | * | 1/2002 | Rhee et al. | 718/104 |
| 6,823,351 | B1 |   | 11/2004 | Flood et al. | |
| 7,016,923 | B2 |   | 3/2006 | Garthwaite et al. | |
| 7,103,887 | B2 |   | 9/2006 | Shavit et al. | |
| 7,159,215 | B2 |   | 1/2007 | Shavit et al. | |
| 7,159,221 | B1 |   | 1/2007 | Willen et al. | |
| 2003/0097395 | A1 |   | 5/2003 | Petersen | |
| 2005/0132363 | A1 | * | 6/2005 | Tewari et al. | 718/1 |
| 2006/0225078 | A1 |   | 10/2006 | Anderson | |
| 2006/0230409 | A1 |   | 10/2006 | Frigo et al. | |
| 2007/0136733 | A1 | * | 6/2007 | Park et al. | 718/108 |

OTHER PUBLICATIONS

Blumofe, et al., "Cilk: An Efficient Multithreaded Runtime System", Previously reported in the Proceedings of the Fifth ACM SIGPLAN Symposium on Principles and Practice of Parallel Programming (PPoPP ' 95), Santa Barbara, CA, Journal Published on Dec. 19, 1995, pp. 1-26.

(Continued)

*Primary Examiner* — Corey S Faherty
(74) *Attorney, Agent, or Firm* — Kevin Sullivan; Raghu Chinagudabha; Micky Minhas

(57) ABSTRACT

A scheduler in a process of a computer system detects a task with an associated execution context that has not been previously invoked by the scheduler. The scheduler executes the task on a processing resource without performing a context switch if the processing resource executed a previous task to completion. The scheduler stores the execution context originally associated with the task for later use.

18 Claims, 5 Drawing Sheets

(56) References Cited

OTHER PUBLICATIONS

Arora, et al., "Thread Scheduling for Multiprogrammed Multiprocessors", ACM Symposium on Parallel Algorithms and Architectures, Proceedings of the tenth annual ACM symposium on Parallel Algorithms and Architectures (SPAA), Year of Publication: 1998, pp. 119-129.

Blumofe, et al., "Scheduling Multithreaded Computations by Work Stealing", Proceedings of the 35th Annual IEEE Conference on Foundations of Computer Science (FOCS'94), Santa Fe, NM, USA, Publication Date: Nov. 20-22, 1994, pp. 356-368.

Blumofe, et al., "The Performance of Work Stealing in Multiprogrammed Environments", Appears as University of Texas at Austin, Department of Computer Sciences, Technical Report TR-98-13, Dated: May 28, 1998, pp. 1-20.

Haller, et al., "Actors that Unify Threads and Events", In: International Conference on Coordination Models and Languages. Lecture Notes in Computer Science (LNCS) (2007), Lamp-Report-2007-001, pp. 1-17.

Kim, et al., "Efficient compilation of concurrent call/return communication in actor-based programming languages", Proceedings of the 3rd International Conference on High-Performance Computing (HiPC '96), Dated: Dec. 19-22, 1996, pp. 62-67.

\* cited by examiner

TASK EXECUTION AND CONTEXT SWITCHING IN A SCHEDULER

BACKGROUND

Processes executed in a computer system may include execution context schedulers that schedule tasks of processes for execution in the computer system. A scheduler may create execution contexts (e.g., threads, fibers, or child processes) in order to execute tasks on processing resources. When a task blocks or is interrupted during execution on a processing resource, the state of the execution context on the processing resource is saved to allow the execution context to later be restored when the task resumes. The processing resource may then switch to a different execution context to continue executing tasks.

The process of switching execution contexts on a processing resource generally involves a significant amount of overhead. The process of saving the state of an execution context is time consuming and typically prevents other tasks from being executed on a processing resource while the state is being saved.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A scheduler in a process of a computer system operates to minimize context switching between execution contexts. The scheduler detects a task with an associated execution context that has not been previously invoked by the scheduler. The scheduler executes the task on a processing resource without performing a context switch if the processing resource executed a most recent previous task to completion. The scheduler stores the execution context originally associated with the task for later use.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
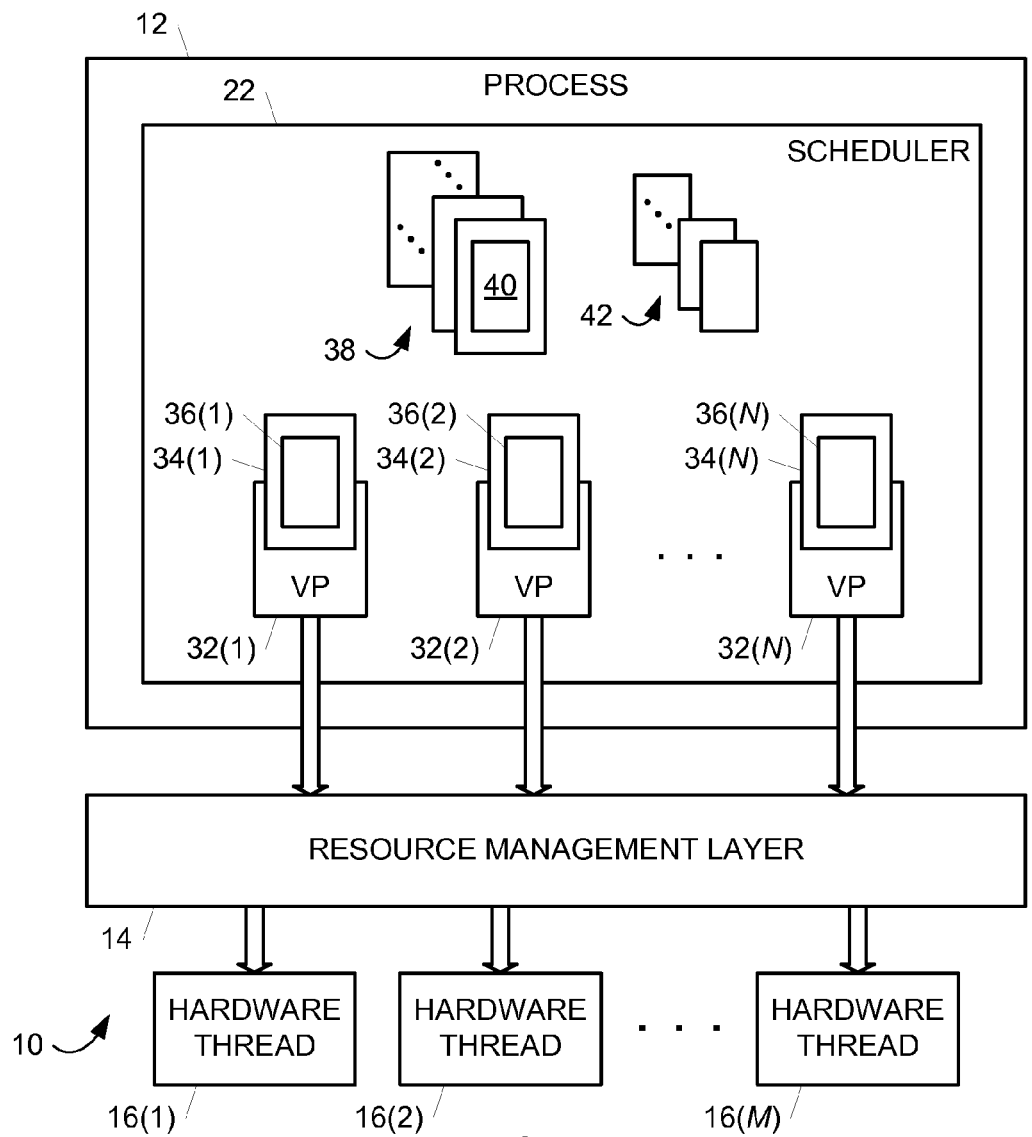
FIG. 1 is a block diagram illustrating an embodiment of a scheduler configured to elide an execution context switch.

FIG. 1 is a block diagram illustrating an embodiment of a scheduler 22 configured to elide an execution context switch in a process 12 of a runtime environment 10.

Runtime environment 10 represents a runtime mode of operation in a computer system, such as a computer system 100 shown in FIG. 6 and described in additional detail below, where the computer system is executing instructions. The computer system generates runtime environment 10 from a runtime platform such as a runtime platform 122 shown in FIG. 6 and described in additional detail below.

Runtime environment 10 includes an least one invoked process 12, a resource management layer 14, and a set of hardware threads 16(1)-16(M), where M is an integer that is greater than or equal to one and denotes the Mth hardware thread 16(M). Runtime environment 10 allows tasks from process 12 to be executed, along with tasks from any other processes that co-exist with process 12 (not shown), using resource management layer 14 and hardware threads 16(1)-16(M). Runtime environment 10 operates in conjunction resource management layer 14 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that hosts one or more execution contexts (viz., threads). Process 12 obtains access to the processing and other resources in the computer system (e.g., hardware threads 16(1)-16(M)) from resource management layer 14. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

Resource management layer 14 allocates processing resources to process 12 by assigning one or more hardware threads 16 to process 12. Resource management layer 14 exists separately from an operating system of the computer system (not shown in FIG. 1) in the embodiment of FIG. 1. In other embodiments, resource management layer 14 or some or all of the functions thereof may be included in the operating system.

Hardware threads 16 reside in execution cores of a set or one or more processor packages (e.g., processor packages 102 shown in FIG. 6 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 14 to negotiate processing and other resources of the computer system in a manner that is transparent to process 12. Resource management layer 14 allocates hardware threads 16 to scheduler 22 based on supply and demand and any policies of scheduler 22.

In the embodiment shown in FIG. 1, scheduler 22 manages the processing resources by creating virtual processors 32 that form an abstraction of underlying hardware threads 16. Scheduler 22 includes a set of virtual processors 32(1)-32(N) where N is an integer greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

The set of execution contexts in scheduler 22 includes a set of execution contexts 34(1)-34(N) with respective, associated tasks 36(1)-36(N) that are being executed by respective virtual processors 32(1)-32(N) and, at any point during the execution of process 12, a set of zero or more execution contexts 38. Each execution context 34 and 38 includes state information that indicates whether an execution context 34 or 38 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 40 and are ready to be executed by an available virtual processor 32. Execution contexts 38 that are blocked also include an associated task 40 and are waiting for data or a message that is being generated by another execution context 34 or will be generated by another execution context 38.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 38 by generating data or a message that will be used by other execution contexts 38.

Figure 2:
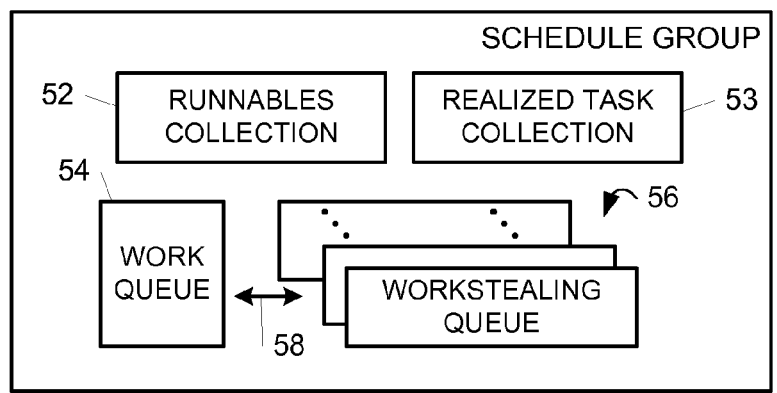
FIG. 2 is a block diagram illustrating an embodiment of a scheduling group for use in a scheduler.

Each task in scheduler 22 may be realized (e.g., realized tasks 36 and 40), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 2 described below.

Upon completion, blocking, or other interruption (e.g., explicit yielding or forced preemption) of an execution context 34 running on a virtual processor 32, the virtual processor 32 becomes available to execute another realized task 40 or unrealized task 42. Scheduler 22 searches for a runnable execution context 38 or an unrealized task 42 to attach to the available virtual processor 32 for execution in any suitable way. For example, scheduler 22 may first search for a runnable execution context 38 to execute before searching for an unrealized task 42 to execute. Scheduler 22 continues attaching execution contexts 38 to available virtual processors 32 for execution until all execution contexts 38 of scheduler 22 have been executed.

In one embodiment, process 12 organizes tasks into one or more schedule groups 50 and presents schedule groups 50 to scheduler 22. FIG. 2 is a block diagram illustrating an embodiment of a schedule group 50 for use in scheduler 22.

Schedule group 50 includes a runnables collection 52, a realized task collection 53, a work collection 54, and a set of zero or more workstealing queues 56. Runnables collection 52 contains a list of unblocked execution contexts 38. Scheduler 22 adds an execution context 38 to runnables collections 52 when an execution context becomes unblocked. Realized task collection 53 contains a list of realized tasks 40 (e.g., unstarted agents) that may or may not have associated execution contexts 38. Scheduler 22 adds a realized task to realized task collection 53 when a new runnable task is presented to scheduler 22 by process 12. Work queue 54 contains a list of workstealing queues 56 as indicated by an arrow 58 and tracks the execution contexts 34 that are executing tasks from the workstealing queues 56. Each workstealing queue 56 includes one or more unrealized tasks 42.

Using the embodiment of FIG. 2, scheduler 22 may first search for unblocked execution contexts 38 in the runnables collection 52 of all schedule groups 50 in scheduler 22. Scheduler 22 may then search for realized tasks in the realized task collection 53 of all schedule groups 50 in scheduler 22 before searching for unrealized tasks in the workstealing queues 56 of the schedule groups 50.

In one embodiment, a virtual processor 32 that becomes available may attempt to locate a runnable execution context 38 in the runnables collection 52 in the schedule group 50 from which the available virtual processor 32 most recently obtained a runnable execution context 38 (i.e., the current schedule group 50). The available virtual processor 32 may then attempt to locate a runnable execution context 38 in the runnables collections 52 in the remaining schedule groups 50 of scheduler 22 in a round-robin or other suitable order. If no runnable execution context 38 is found, then the available virtual processor 32 may then attempt to locate an unrealized task 42 in the workstealing queues 56 of the current schedule group 50 before searching the workstealing queues 56 in the remaining schedule groups 50 of scheduler 22 in a round-robin or other suitable order.

Figure 6:
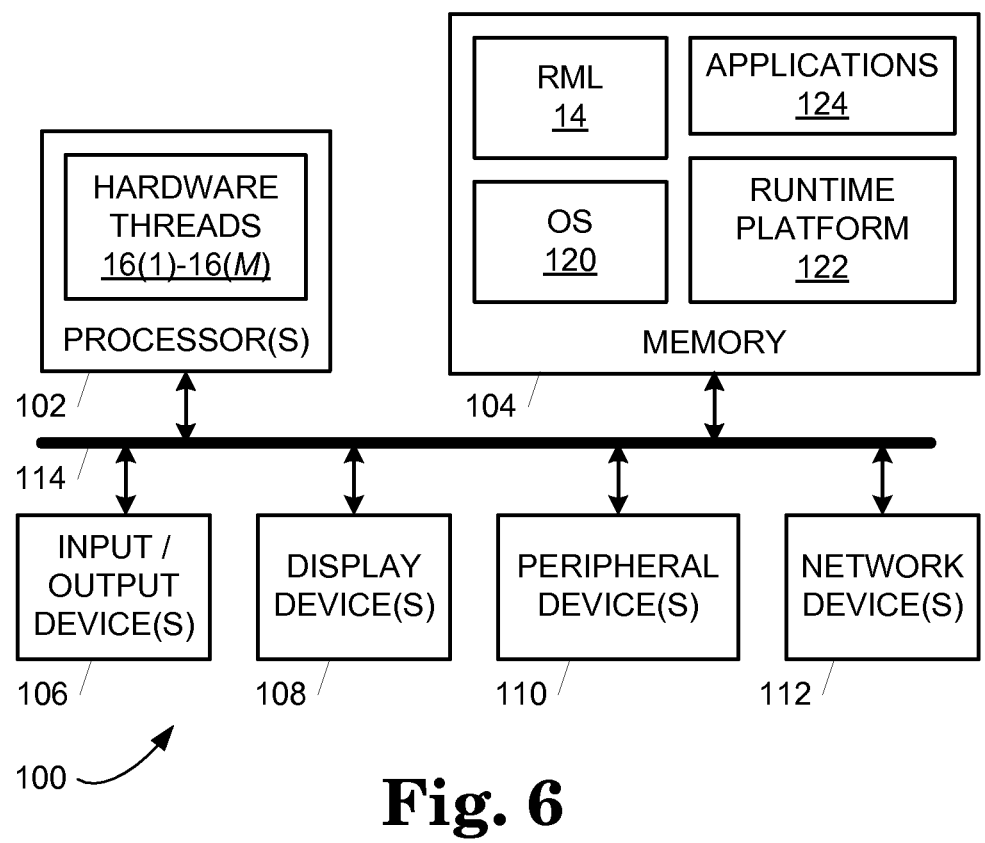
FIG. 6 is a block diagram illustrating an embodiment of a computer system configured to implement a runtime environment including a scheduler configured to elide an execution context switch.

Prior to executing tasks, scheduler 22 obtains execution contexts 34 and 38 from runtime environment 10 or an operating system (e.g., OS 120 of FIG. 6). Available virtual processors 32 locate and execute execution contexts 34 to begin executing tasks. Virtual processors 32 become available again in response to an execution context 34 completing, blocking, or otherwise being interrupted. When virtual processors 32 become available, virtual processors 32 switch to a runnable execution context 38 or execute a next task 40 or 42 as a continuation on a current execution context 34 if the previous task 36 executed by the current execution context 34 completed.

Scheduler 22 operates to minimize context switching between execution contexts 34 and 38. When a virtual processor 32 executes a task 36 to completion (i.e., task 36 does not block and is not otherwise interrupted) and becomes available, the available virtual processor 32 attempts to execute a next task 40 or 42 as a continuation on a current execution context 34. If the next task 40 is possibly already associated with an execution context 38, the available virtual processor 32 executes the task 40 as a continuation on a current execution context 34 if the task 40 has not been previously invoked by scheduler 22. The available virtual processor 32 executes the task 40 without switching to the execution context 38 associated with the task 40. Scheduler 22 stores the execution context 38 for later use by the same or another virtual processor 32. By doing so, scheduler 22 and the available virtual processor 32 elide a context switch in executing an uninvoked task 40 originally associated with an execution context 38.

Figure 3:
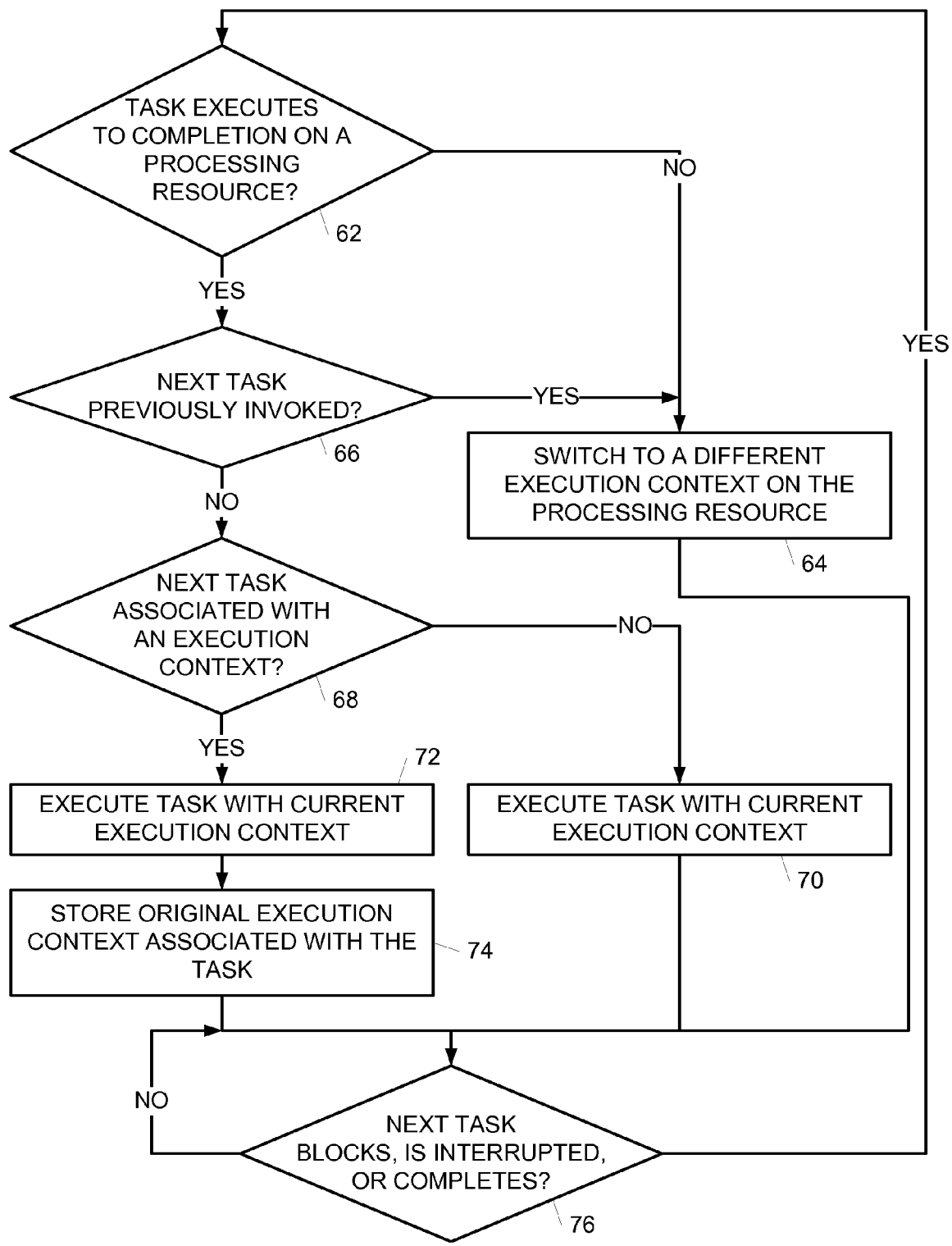
FIG. 3 is a flow chart illustrating an embodiment of a method for eliding an execution context switch.
Figure 4A:
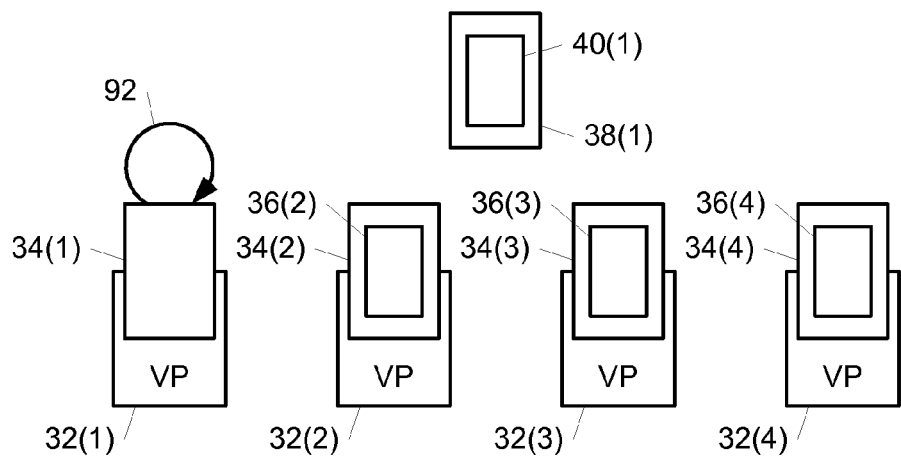
FIGS. 4A-4C are block diagrams illustrating embodiments of execution context switching.
Figure 4B:
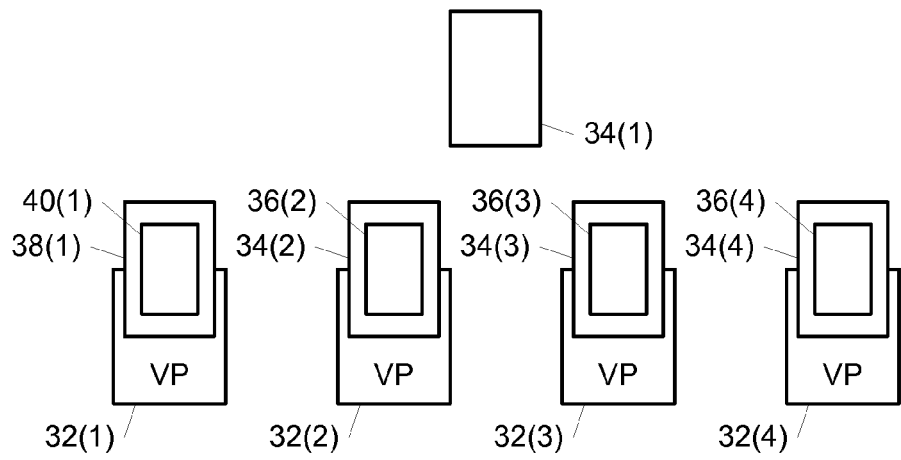
Figure 4C:
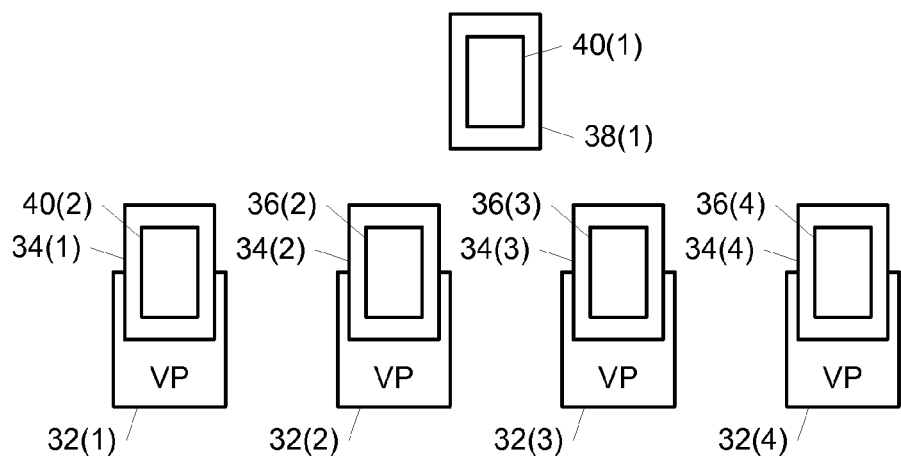
Figure 5A:
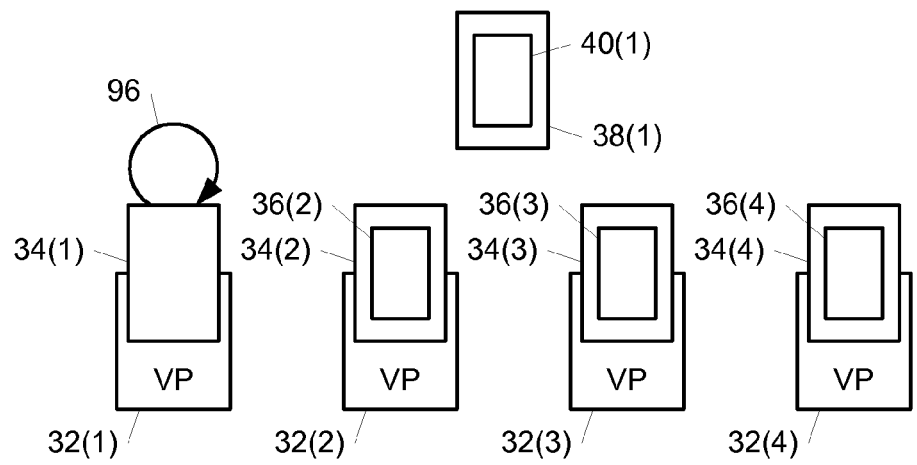
FIGS. 5A-5C are block diagrams illustrating embodiments of eliding an execution context switch.
Figure 5B:
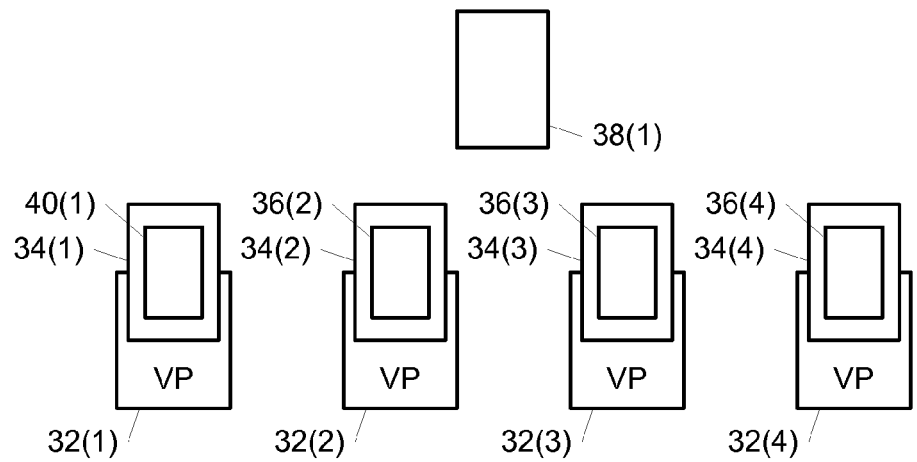
Figure 5C:
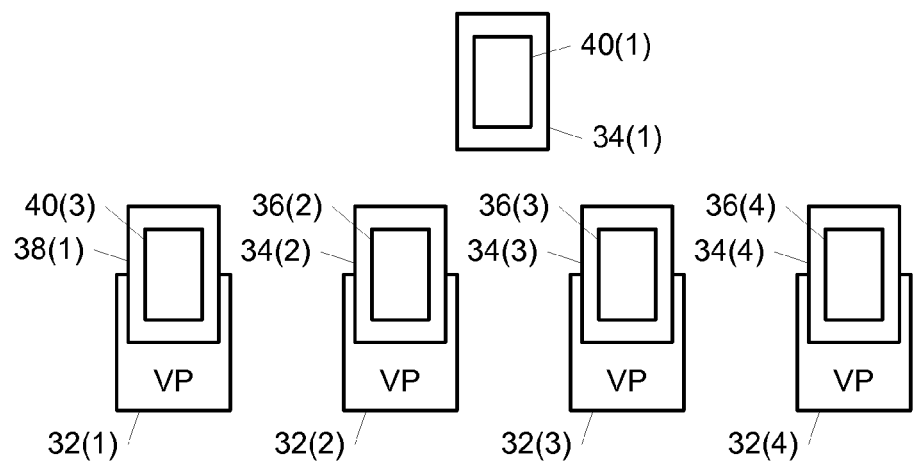

FIG. 3 is a flow chart illustrating an embodiment of a method for eliding an execution context switch. The method of FIG. 3, as performed by scheduler 22, will be described with reference to the embodiments of FIGS. 4A-4C and FIGS. 5A-5C. FIGS. 4A-4C are block diagrams illustrating embodiments of execution context switching. FIGS. 5A-5C are block diagrams illustrating embodiments of eliding an execution context switch.

In FIG. 3, a determination is made in scheduler 22 as to whether a task 36 executes to completion on a processing resource as indicated in a block 62. The processing resource detects whether the task 36 executed to completion without blocking or being interrupted. If the task did not execute to completion (i.e., the task blocked or was interrupted), then the processing resource switches to a different execution context 38 as indicated in a block 64. The processing resource causes the blocked or interrupted execution context 34 to be stored and begins executing a next task 40 or 42 with a new execution context 38 in scheduler 22 if one is available. If the previous task 36 executed to completion, then the processing resource may be able to execute the next task 40 or 42 as a continuation on execution context 34.

In the example of FIGS. 4A-4C, virtual processor 32(1) has become available subsequent to executing a task 36(1) (not shown in FIG. 4A) with an execution context 34(1) that blocked or was interrupted. Virtual processor 32(1) is searching for a next task 40 or 42 to execute as indicated by an arrow 92. Virtual processors 32(2)-32(4) are executing respective tasks 36(2)-36(4) with respective execution contexts 34(2)-34(4).

If task 36(1) blocked or was interrupting while executing on virtual processor 32(1), then virtual processor 32(1) performs a context switch from execution context 34(1) to execution context 38(1) and executes a next task 40(1) with execution context 38(1) as shown in FIG. 4B. Virtual processor 32(1) causes the blocked or interrupted execution context 34(1) to be stored.

If task 40(1) blocks or is interrupted while executing on virtual processor 32(1), virtual processor 32(1) causes execution context 38(1) to be stored and searches for another execution context 34 or 38 with an associated task 40 or 42 to execute. When virtual processor 32(1) searches for a next task 40 or 42 to execute, virtual processor 32(1) may execute a task 40(2) associated with execution context 34(1) as shown in the example of FIG. 4C. If task 40(1) completes, virtual processor 32(1) may repeat the function of block 62.

Referring back to FIG. 3, if the task 36 executed to completion, then a determination is made by scheduler 22 as to whether the next task to execute is a task 40 that has been previously invoked by scheduler 22 indicated in a block 66. If the next task has been previously invoked by scheduler 22, then the processing resource switches to a different execution context 38 to execute the task as indicated in block 64.

If the next task 40 or 42 has not been previously invoked by scheduler 22, then a determination is made by scheduler 22 as to whether the next task 40 or 42 is associated with an execution context 38 as indicated in a block 68. If the next task 40 or 42 has not been associated with an execution context 38, then the processing resource executes the next task 40 or 42 with a current execution context 34 as indicated in a block 70.

The processing resource executes the next task 40 or 42 as a continuation on the current execution context 34.

In the example of FIG. 5A, virtual processor 32(1) has become available subsequent to executing task 36(1) (not shown in FIG. 5A) to completion with execution context 34(1). Virtual processor 32(1) is searching for a next task 40 or 42 to execute as indicated by an arrow 96. Virtual processors 32(2)-32(4) are executing respective tasks 36(2)-36(4) with respective execution contexts 34(2)-34(4).

Because task 36(1) completed, virtual processor 32(1) may search for a next task 40 or 42 to execute as a continuation on execution context 34(1). Virtual processor 32(1) may also perform a context switch from execution context 34(1) to execution context 38(1), execute a next task 40(1) with execution context 38(1), and cause execution context 34(1) to be stored as described above with reference to FIG. 4B.

Referring back to FIG. 3, if a next task 40 has an associated execution context 38 and has not been previously invoked by scheduler 22, then the processing resource executes the uninvoked task 40 with a current execution context 34 as indicated in a block 72. Because the next task 40 has not been previously invoked by scheduler 22, the task 40 may be executed without performing a context switch to the execution context 38 associated with the task 40. Instead, the processing resource executes the task 40 as a continuation on the current execution context 34.

Referring to FIGS. 5A-5B, virtual processor 32(1) identifies a next task 40(1) to execute where task 40(1) is associated with execution context 38(1). Virtual processor 32(1) detects that task 40(1) has not been previously invoked by scheduler 22. Because task 36(1) executed to completion, virtual processor 32(1) elides a context switch from execution context 34(1) to execution context 38(1) and executes task 40(1) with execution context 34(1) as shown in FIG. 5B. Virtual processor 32(1) executes task 40(1) as a continuation on execution context 34(1) and does not switch to execution context 38(1).

Scheduler 22 stores the original execution context associated with the task for later use as indicated in a block 74. As shown in FIG. 5B, virtual processor 32(1) causes execution context 38(1) to be stored in response to executing task 40(1) with execution context 34(1).

A determination is made by scheduler 22 as to whether as the task 40 blocks, is interrupted, or completes as indicated in a block 76. Subsequent to the next task 40 blocking, being interrupted, or completing, the processing resource repeats the function of block 62.

In the example of FIG. 5C, task 40(1) blocks or is interrupted while executing with execution context 34(1) on virtual processor 32(1). Virtual processor 32(1) performs a context switch from execution context 34(1) to execution context 38(1) (i.e., the execution context originally associated with task 40(1)) to execute a task 40(3) associated with execution context 38(1).

In other examples, another virtual processor 32 may switch to execution context 38(1) (i.e., the execution context originally associated with task 40(1)) and execute subsequent tasks 40 and/or 42 associated with execution context 38(1).

FIG. 6 is a block diagram illustrating an embodiment of computer system 100 which is configured to implement runtime environment 10 including scheduler 22 configured to elide an execution context switch as described above.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), an operating system (OS) 120, a runtime platform 122, applications 124, and resource management layer 14 (also shown in FIG. 1). Each hardware thread 16 may execute the instructions in conjunction with or in response to information received from input/output devices 106, display devices 108, peripheral devices 110, and/or network devices 112.

Computer system 100 boots and executes OS 120. OS 120 includes instructions executable by hardware threads 16 to manage the components of computer system 100 and provide a set of functions that allow applications 124 to access and use the components. In one embodiment, OS 120 is the Windows operating system. In other embodiments, OS 120 is another operating system suitable for use with computer system 100.

Resource management layer 14 includes instructions that are executable in conjunction with OS 120 to allocate resources of computer system 100 including hardware threads 16 as described above with reference to FIG. 1. Resource management layer 14 may be included in computer system 100 as a library of functions available to one or more applications 124 or as an integrated part of OS 120.

Runtime platform 122 includes instructions that are executable in conjunction with OS 120 and resource management layer 14 to generate runtime environment 10 and provide runtime functions to applications 124. These runtime functions include a scheduler function as described in additional detail above with reference to FIG. 1. The runtime functions may be included in computer system 100 as part of an application 124, as a library of functions available to one or more applications 124, or as an integrated part of OS 120 and/or resource management layer 14.

Each application 124 includes instructions that are executable in conjunction with OS 120, resource management layer 14, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 120, resource management layer 14, runtime platform 122, and applications 124. The instructions are executable by computer system to perform the functions and methods of OS 120, resource management layer 14, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a scheduler of a process executing on a computer system, the method comprising:
    executing a first task associated with a first execution context to completion without blocking or being interrupted on a first processing resource allocated to the scheduler; and
    executing a second task, distinct from the first task and associated with a second execution context, with the first execution context on the first processing resource in response to the second task not being invoked previously by the scheduler.

2. The method of claim 1 further comprising:
    executing the second task with the second execution context on the first processing resource in response to the second task being invoked previously by the scheduler.

3. The method of claim 2 further comprising:
    performing a context switch from the first execution context to the second execution context on the first processing resource in response to the second task being invoked previously by the scheduler.

4. The method of claim 1 further comprising:
    storing the second execution context in response to executing the second task with the first execution context.

5. The method of claim 1 further comprising:
    switching to the second execution context on the first processing resource to execute a third task associated with the second execution context and previously invoked by the scheduler subsequent to executing the second task with the first execution context.

6. The method of claim 1 further comprising:
    switching to the second execution context on a second processing resource allocated to the scheduler to execute a third task associated with the second execution context and previously invoked by the scheduler subsequent to executing the second task with the first execution context.

7. The method of claim 1 further comprising:
    obtaining the first execution context from an operating system prior to executing the first task.

8. The method of claim 1 wherein the first processing resource includes a virtual processor and a hardware thread.

9. A computer readable storage medium storing computer-executable instructions that, when executed by a computer system, perform a method in a scheduler in a process executing on the computer system, the method comprising:
    executing a first task associated with a first execution context as a continuation on a second execution context on a first processing resource of the scheduler in response to the first task being not invoked previously by the scheduler; and
    performing a first context switch from the second execution context to the first execution context on the first processing resource in response to the first task being invoked previously by the scheduler; and
    performing a second context switch from a third execution context to the first execution context on a second processing resource of the scheduler to execute a second task associated with the first execution context.

10. The computer readable storage medium of claim 9, the method further comprising:
    storing the first execution context in response to executing the first task with the second execution context.

11. The computer readable storage medium of claim 10, the method further comprising:
    performing a second context switch from the second execution context to the first execution context on the first processing resource to execute a third task associated with the first execution context subsequent to executing the first task with the second execution context.

12. The computer readable storage medium of claim 9, the method further comprising:
    executing the first task with the first execution context on the first processing resource subsequent to performing the first context switch.

13. The computer readable storage medium of claim 9, the method further comprising:
    executing a third task associated with the second execution context to completion on the first processing resource prior to executing the first task with the second execution context.

14. The computer readable storage medium of claim 9, the method further comprising:
    performing the first context switch from the second execution context to the first execution context on the first processing resource in response to a third task associated with the second execution context blocking or being interrupted.

15. A method performed by a scheduler in a process executing on a computer system comprising:

detecting a first task associated with a first execution context, wherein the first task has not been invoked previously by the scheduler; and executing the first task as a continuation on a second execution context on a first processing resource of the scheduler in response to a second task executed by the first processing resource with the second execution context completing and not blocking or being interrupted.

16. The method of claim 15 further comprising:

storing the first execution context in response to executing the first task as the continuation.

17. The method of claim 15 further comprising:

performing a context switch from the second execution context to the first execution context on the first processing resource to execute a third task associated with the first execution context subsequent to executing the first task as the continuation.

18. The method of claim 15 further comprising:

performing a context switch from a third execution context to the first execution context on a second processing resource of the scheduler to execute a third task associated with the first execution context.

\* \* \* \* \*